United States Patent [19]

Le Gauyer

[11] Patent Number: 5,219,019

[45] Date of Patent: Jun. 15, 1993

[54] FASTENING DEVICE FOR SECURING A SECONDARY HEAT EXCHANGER OF THE SERPENTINE TYPE TO A MAIN HEAT EXCHANGER, AND HEAT EXCHANGER APPARATUS INCORPORATING SUCH A FASTENING DEVICE

[75] Inventor: Philippe Le Gauyer, Paris, France

[73] Assignee: Valeo Thermique Moteur, Le-Mesnil-Saint Denis, France

[21] Appl. No.: 771,167

[22] Filed: Oct. 3, 1991

[30] Foreign Application Priority Data

Oct. 12, 1990 [FR] France .................. 90 12642

[51] Int. Cl.$^5$ ............................................. F28F 90/00
[52] U.S. Cl. ........................................ 165/67; 165/140
[58] Field of Search .................. 165/67, 122, 140; 248/213.3, 635

[56] References Cited

U.S. PATENT DOCUMENTS

| 2,507,555 | 5/1950 | Berthiez ................ 74/397 |
| 3,093,189 | 6/1963 | Panthofer ........... 165/122 X |
| 3,837,127 | 9/1974 | McMichael et al. ........ 52/126 |
| 4,138,857 | 2/1979 | Dankowski ............. 62/239 |
| 4,190,105 | 2/1980 | Dankowski . |
| 4,330,030 | 5/1982 | Cate .................... 165/67 |
| 4,893,532 | 1/1990 | Walburn ................ 82/148 |

FOREIGN PATENT DOCUMENTS

| 0367078 | 10/1989 | European Pat. Off. . |
| 3922814 | 7/1989 | Fed. Rep. of Germany . |
| 2640207 | 6/1989 | France . |
| 2149042 | 10/1984 | United Kingdom . |

Primary Examiner—Allen J. Flanigan
Attorney, Agent, or Firm—Morgan & Finnegan

[57] ABSTRACT

The fastening device comprises at least one spacer which fits in a U-shaped bend of the serpentine tube of the secondary heat exchanger. The shape of this spacer is symmetrical about an axis of revolution and is adapted to fit in the U-shaped bend. The spacer also defines a fastening axis parallel to and offset from the axis of revolution, and is fixed to an associated anchor point on the main heat exchanger by a fastening means extending along this fastening axis. With this arrangement the angular orientation of the spacer about its fastening axis can be adjusted in order to compensate for any alignment errors between the U-shaped bend and the associated anchor point.

8 Claims, 1 Drawing Sheet

FASTENING DEVICE FOR SECURING A SECONDARY HEAT EXCHANGER OF THE SERPENTINE TYPE TO A MAIN HEAT EXCHANGER, AND HEAT EXCHANGER APPARATUS INCORPORATING SUCH A FASTENING DEVICE

FIELD OF THE INVENTION

This invention relates to a fastening device for securing a secondary heat exchanger of the serpentine type to a main heat exchanger. The main heat exchanger typically consists of a cooling radiator for the internal combustion engine of a motor vehicle. The invention also relates to heat exchanger apparatus comprising the group of heat exchangers comprising a main heat exchanger, a secondary heat exchanger of the serpentine type, and fastening means securing the secondary heat exchanger to the first heat exchanger.

BACKGROUND OF THE INVENTION

It is known to secure on the cooling radiator of a motor vehicle a further heat exchanger which may for example be a condenser of an air conditioning installation, or a low temperature secondary radiator for supplying a radiator for cooling supercharging air for the engine.

The main heat exchanger and the secondary heat exchanger are arranged in generally parallel planes, such that the fresh air which is drawn from outside the cabin of the vehicle can cool both the fluid flowing in the main heat exchanger and that flowing in the serpentine tube of the secondary heat exchanger. The fluid flowing in the main heat exchanger is then the cooling fluid for the engine, while that flowing in the serpentine tube may be a refrigerant fluid where the secondary heat exchanger is a condenser, or alternatively, it may be the same cooling liquid as is flowing in the main heat exchanger in the case where the secondary heat exchanger is used in the cooling of supercharging air as mentioned above.

The secondary heat exchanger commonly has a serpentine tube which comprises parallel tube sections joined in pairs by U-shaped bends or crook portions. The parallel tube sections and the bends may typically be of circular or flattened cross section, being associated with cooling fins. The secondary heat exchanger is usually fastened to the main heat exchanger by means of resilient pegs, of which there may be four for example. These pegs are joined firstly to the bends of the serpentine tube, and secondly to anchor points which are provided on the main heat exchanger, and typically on the water boxes of the latter.

Since these heat exchangers are mass produced and subject to dimensional variations, it often happens that the anchor points of a given main heat exchanger do not exactly coincide with the corresponding elements of the serpentine tube of the secondary heat exchanger which are to be anchored at these anchor points. This gives rise to problems during assembly of the apparatus.

DISCUSSION OF THE INVENTION

A main object of the invention is to overcome this disadvantage.

According to the invention in a first aspect, there is provided a fastening device for fastening a secondary heat exchanger of the serpentine type to a main heat exchanger, the secondary heat exchanger having a serpentine duct in the form of a tube comprising a plurality of tube sections joined in pairs by means of bends, the fastening device comprising at least one spacer which is adapted to fit in a said U-shaped bend of the serpentine tube, with the said spacer having a shape which is symmetrical about an axis of revolution and which is adapted to fit the U-shaped bend, the said spacer having also a fastening axis parallel to but offset from the said axis of revolution, so that the spacer can be secured in line with the fastening axis to an associated anchor point of the main heat exchanger, the arrangement being such that the angular orientation of the spacer about its fastening axis is adjustable in order to compensate for any alignment error between the U-shaped bend and the associated anchor point.

Thus the invention makes it possible to adjust the angular orientation of each of the spacers used for securing the serpentine tube, and thus to compensate for any alignment faults between the anchor points of the main heat exchanger and the corresponding bends of the serpentine tube.

In a preferred embodiment of the invention, the spacer has a bore which is formed along the fastening axis and which is open in two opposite end faces of the said spacer, with the fastening device further including a fastening member adapted to fit on the anchor point and to pass through the bore of the spacer. Thus, after the angular position of the spacer has been adjusted it can be retained in that position by the fastening member.

The fastening member is preferably in the form of a male threaded member such as a bolt, in combination with a nut. The male fastening member then includes a head which is adapted to be fitted to the anchor point of the main heat exchanger, together with a threaded shank which can pass through the bore of the spacer.

According to a preferred feature of the invention, one of the end faces of the spacer is an abutment face for abutting against the anchor point of the main heat exchanger, while the other end face is extended in a collar so that the U-shaped bend of the serpentine tube can be retained between the collar and the anchor point.

According to the invention in a second aspect, a heat exchanger assembly comprises a secondary heat exchanger of the serpentine type, fastened to a main heat exchanger, with the serpentine tube of the secondary heat exchanger fastened to the main heat exchanger by means of at least one fastening device according to the said first aspect of the invention.

This fastening is preferably obtained by means of four of the said fastening devices. When the main heat exchanger has two water boxes, the serpentine tube is preferably fastened to each water box by means of two said fastening devices. However, it is of course possible to secure a serpentine tube on a main heat exchanger having only one water box. In that case, the serpentine tube can be attached to this water box by means of two fastening devices in accordance with the invention.

The heat exchanger assembly in accordance with the invention may also include, in known manner, a support for a motorised fan unit. According to a preferred feature of the invention, in that case the fastening devices of the invention are also used to secure this support to the two heat exchangers.

Further features and advantages of the invention will appear more clearly from the description of preferred

DESCRIPTION OF PREFERRED EMBODIMENTS OF THE INVENTION

Figure 1:
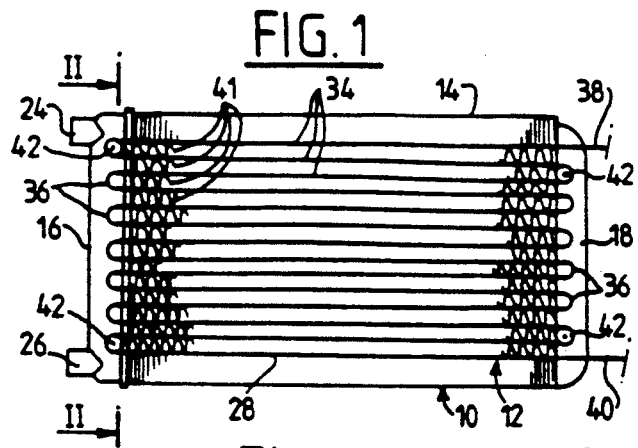
FIG. 1 is a view in elevation of a group of heat exchangers comprising a main heat exchanger with a secondary heat exchanger of the serpentine type, fixed to the first heat exchanger by means of four fastening devices in accordance with the invention.

A group of heat exchangers shown in FIG. 1 comprises a main heat exchanger 10, such as a cooling radiator for an internal combustion engine of a motor vehicle, together with a secondary heat exchanger 12. The secondary heat exchanger 12 is of the serpentine type, and in this example it is a condenser forming part of an air conditioning installation of the motor vehicle.

Figure 3:
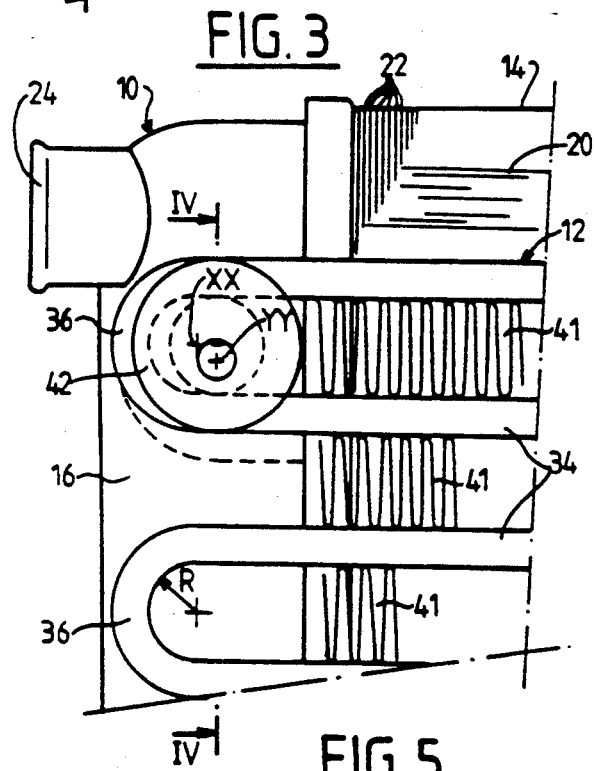
FIG. 3 is a partial view on a larger scale of part of the group of heat exchangers seen in FIG. 1.

The main heat exchanger 10, in known manner, comprises a tube bundle 14 consisting of a plurality of tubes 20 passing through a matrix of cooling fins 22 (FIG. 3). The water box 16 is provided with two tube branches 24 and 26 for the admission and removal of the cooling liquid that passes through the heat exchanger 10.

Figure 2:
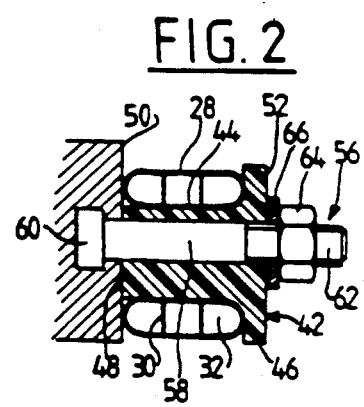
FIG. 2 is a view in partial cross section and on a larger scale, the cross section being taken on the line II—II in FIG. 1.

The secondary heat exchanger 12 comprises a serpentine duct 28, which in this example is a tube of flattened cross section, having two internal partitions 30 and 32 (FIG. 2). The serpentine tube 28 comprises two parallel tube sections 34, which are joined in pairs by U-shaped ends or crook portions 36. In this example the tube 28 is made from a single length of tube which has an input end 38 and an output end 40 (FIG. 1). Thus the general shape of the tube 28 is rectangular, with the length and width of the rectangle being respectively smaller than the length and width of the main heat exchanger. The tube sections 34 are joined together in pairs by cooling fins 41, which are substantially sinusoidal in shape.

Figure 4:
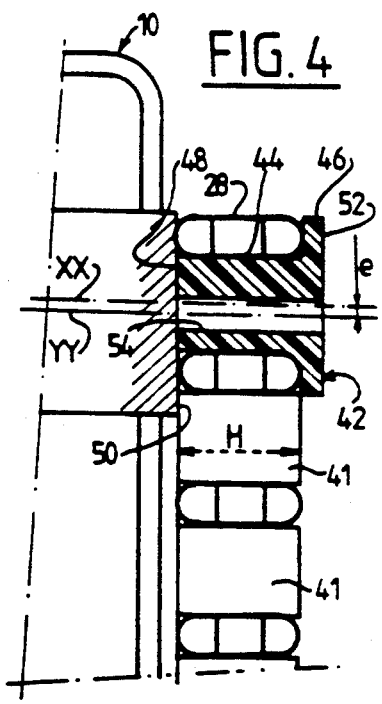
FIG. 4 is a view in partial cross section taken on the line IV—IV in FIG. 3.

As shown in FIG. 1, the tube 28 is fastened through four spacers 42 to the main heat exchanger 10. Two of these spacers 42 are connected to the water box 16, and the other two to the water box 18. Each spacer 42 is symmetrical about an axis of revolution XX (FIG. 4). In this example, the spacer 42 comprises a cylindrical body 44, the radius of which corresponds substantially to the internal radius R of a bend 36, and a cylindrical collar 46, the radius of which is greater than that of the cylindrical body 44. The spacer 42 has an end face 48 which is arranged to abut against an anchor boss 50 of the water box 16 or 18, and an opposite end face 52 defining one side of the cylindrical collar 46. The height H (FIG. 4) of the cylindrical body 44, measured between the abutment face 48 and the collar 46, substantially corresponds to the largest cross sectional dimension of the serpentine tube 28.

Accordingly, the collar 46 enables the corresponding bend 36 to be held in engagement on the boss 50 of the water box.

The spacer 42 also has a bore 54 which lies on an axis YY which is parallel to the axis XX but offset from it (see FIG. 4). The axes XX and YY are separated from each other by an offset e (FIGS. 3 and 4) which enables any possible error in alignment between the U-shaped bend 36 and the corresponding boss 50 of the water box to be compensated for. As can be seen in FIG. 2, the spacer 42 is fixed on the boss by means of a fastening member 56. This comprises a bolt 58, having a head 60 which is inserted in the boss 50, together with a threaded shank 62 for carrying a nut 64, with a washer 66 interposed. The water boxes 16 and 18 are preferably formed of a plastics material, with each water box having an integral boss 50 formed during moulding of the water box. Thus these bosses 50 define anchor points for the four spacers 42 shown in FIG. 1.

In order to secure the serpentine tube 28 on the heat exchanger 10, the four bolts 58 are first fitted on their respective bosses 50. The four spacers are fitted in the bends 36 of the serpentine tube 28, which is then offered up to the bosses 50, with the bore 54 of each spacer being fitted on to the corresponding bolt 58. The angular position of each spacer 42 can be adjusted independently of the others, so as to compensate for any alignment errors between the U-shaped bend 36 and the associated anchor point defined by the corresponding boss 50 and bolt 58. The washers 66 and nuts 64 are then fitted, and each spacer 42 is then retained in its angular position. Thus, in the embodiment shown in FIGS. 1 to 4, the serpentine tube 28 can be fitted to the main heat exchanger 10 with correction of any alignment errors resulting from dimensional variations during manufacture of the two heat exchangers.

Figure 5:
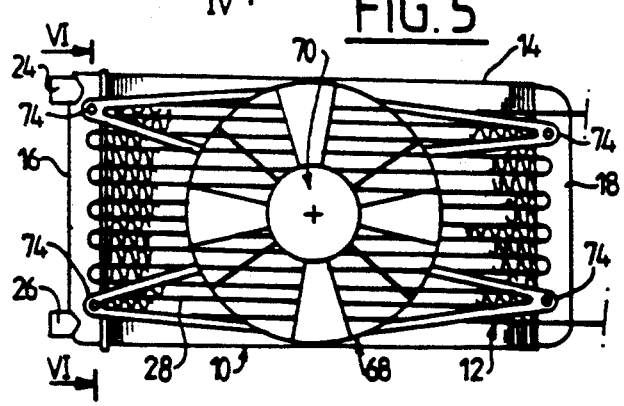
FIG. 5 is a view in elevation of a group of heat exchangers similar to those in FIG. 1 but also including a support for a motorised fan unit.
Figure 6:
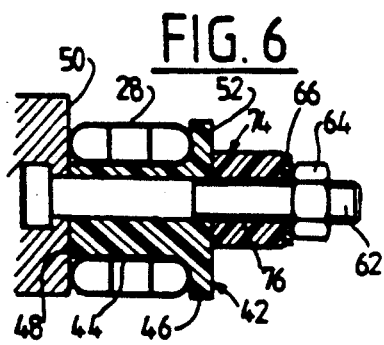
FIG. 6 is a view in cross section taken on the line VI—VI in FIG. 5.

In the embodiment shown in FIGS. 5 and 6, to which reference is now made, the group of two heat exchangers 10 and 12 also includes a support 68 for a motorised fan unit 70. The support 68 comprises four securing arms 72 each of which terminates in an end portion 74. The respective positions of the four end portions 74 corresponds substantially to the position of the four anchor points, i.e. the four bosses 50 of the main heat exchanger 10. Each end portion 74 has a bore 76 (see FIG. 6) through which the threaded shank of the corresponding bolt 58 passes. Each bolt 58 thus receives successively a spacer 42, an end portion 74, a washer 66, and a nut 64.

The invention is of course capable of numerous modifications. For example, the serpentine tube 28 could be formed of tube of circular section. Similarly, the profile of the body of each spacer 42 may be defined by inwardly curved generators instead of rectilinear generators. In addition, the serpentine tube 28 may, instead of being part of an air conditioning condenser, be part of a low temperature secondary radiator for supplying a cooling radiator for supercharging air for the engine. In this latter case, the cooling liquid that flows through the main heat exchanger 10 is the same liquid that flows through the serpentine tube 28.

What is claimed is:

1. A fastening device for heat exchanger apparatus comprising a main heat exchanger having means defining at least one anchor point, and a secondary heat exchanger of the serpentine type secured by at least one said fastening device to the main heat exchanger and comprising a plurality of tube sections and a plurality of U-shaped bends, each bend joining a pair of tube sections wherein the fastening device comprises at least one spacer defining an axis of revolution and having a shape which is symmetrical about said axis of revolution and which is adapted to cooperate with one of said U-shaped bends, the spacer further having a bore defining a fastening axis parallel to but offset from said axis of revolution, the spacer having a body portion and two end faces, said bore extending through both end faces, one said end face of the spacer being adapted to abut against the anchor point, while the other said end face includes a collar for retaining said one U-shaped bend between the collar and the anchor point, the device further including fastening means for securing the spacer along its fastening axis to said anchor point, whereby the angular orientation of the spacer about its fastening axis is adjustable so as to compensate for any alignment error between the U-shaped bend and the anchor point.

2. Heat exchanger apparatus comprising a main heat exchanger having an anchor point, a secondary heat exchanger of the serpentine type, the secondary exchanger having a plurality of tube sections and U-shaped bend portions, each bend portion joining a pair of tube sections, and fastening means securing the secondary heat exchanger to the main heat exchanger, the fastening means comprising at least one spacer defining an axis of revolution and having a shape which is symmetrical about the said axis of revolution and which is adapted to engage one of said U-shaped bends, the spacer further defining a fastening axis parallel to but offset from the said axis of revolution, the device further including fastening means for securing the spacer along its fastening axis to said anchor point, whereby the angular orientation of the spacer about its fastening axis is adjustable so as to compensate for any alignment error between the U-shaped bend and the anchor point.

3. Heat exchanger apparatus according to claim 2, having four of said fastening devices.

4. Heat exchanger apparatus according to claim 3, wherein the main heat exchanger comprises two water boxes, the serpentine tube being connected to each water box by means of two of said fastening devices.

5. Heat exchanger apparatus according to any one of claims 2 to 4, further including a support for a motorised fan unit, with said fastening devices securing said support to the heat exchangers.

6. A fastening device for heat exchanger apparatus comprising a main heat exchanger having means defining at least one anchor point, and a secondary heat exchanger of the serpentine type secured by at least one said fastening device to the main heat exchanger and comprising a plurality of tube sections and a plurality of U-shaped bends, each bend joining a pair of tube sections wherein the fastening device comprises at least one spacer defining an axis of revolution and having a shape which is symmetrical about said axis of revolution and which is adapted to cooperate with one of said U-shaped bends, the spacer further having a bore defining a fastening axis parallel to but offset from said axis of revolution, the spacer having a body portion and two end faces, and a bore extending through both end faces, one said end faces of the spacer being adapted to abut against the anchor point, while the other end face includes a collar for retaining a corresponding U-shaped bend between the collar and the anchor point, the device further including fastening means for securing the spacer along its fastening axis to said anchor points, the fastening means comprising a male threaded member and a nut, the male threaded member having a head adapted to be fitted to the anchor point, together with a threaded shank for extending through the bore of the spacer whereby the angular orientation of the spacer about its fastening axis is adjustable so as to compensate for any alignment error between the U-shaped bend and the associated anchor point.

7. A heat exchanger assembly comprising:
a first heat exchanger having an anchor point;
a second serpentine tube heat exchanger having a plurality of tube sections, each pair of tube sections being connected by a looped portion;
spacer means disposed between a pair of said tube sections, each spacer means having a body portion and a pair of end faces, one of said end faces abutting against said first heat exchanger at said anchor point, the other end face including a collar, each tube section of said pair of tube sections being disposed between said collar and said first heat exchanger, said spacer having an axis of revolution and being symmetrical about said axis of revolution and a bore having a fastening axis parallel to but offset from said axis of revolution, said bore extending through the body portion and both end faces of said spacer; and
fastening means fixed to said first heat exchanger at said anchor point and disposed in said bore, said spacer means being rotatable about said fastening axis so as to align said looped portion with said anchor point.

8. A heat exchanger apparatus according to claim 5 wherein said support comprises at least one arm member having an end portion, said end portion having a bore for receiving said male threaded member of the fastening means.

* * * * *